United States Patent

[11] 3,587,649

| [72] | Inventor | Rolf Lechler<br>Neckarsulm, Germany |
|---|---|---|
| [21] | Appl. No. | 820,415 |
| [22] | Filed | Apr. 30, 1969 |
| [45] | Patented | June 28, 1971 |
| [73] | Assignee | NSU Motorenwerke Aktiengesellschaft<br>Neckarsulm, Germany |
| [32] | Priority | May 4, 1968 |
| [33] | | Germany |
| [31] | | P 17 50 469.7 |

[54] SELECTOR VALVE
4 Claims, 5 Drawing Figs.

[52] U.S. Cl. .................................................. 137/625.47
[51] Int. Cl. ..................................................... F16k 11/08
[50] Field of Search............................................ 137/625.4,
625.41, 625.46, 625.47, 625.15, 625.16, 625.17,
625.19; 251/310

[56] References Cited
UNITED STATES PATENTS
| 733,958 | 7/1903 | Greene.......................... | 137/625.15 |
| 2,840,109 | 6/1958 | Wadleigh....................... | 251/310X |
| 2,973,181 | 2/1961 | Johnson ........................ | 251/310X |

FOREIGN PATENTS
| 6,703 | 10/1895 | Great Britain................ | 137/625.46 |

Primary Examiner—M. Cary Nelson
Assistant Examiner—Michael O. Sturm
Attorney—Kane, Dalsimer, Kane, Sullivan and Kurucz ABSTRACT: A selector valve especially for warm water heating systems in motor vehicles. The valve includes a casing with inlet and outlet ports which are controlled by a rotary valve member arranged within the casing. The internal cavity of the casing which houses the valve member is provided at its end wall and preferably also in its peripheral wall with inlet and outlet ports which are controlled by the end face and by the peripheral surface respectively of the valve member. The rim of the port arranged in the end wall is formed as a valve seating onto which the valve member is resiliently urged. The valve member is supported within the casing solely outside the internal cavity thereby providing a selector valve which is not sensitive to dirt, deposits and corrosion.

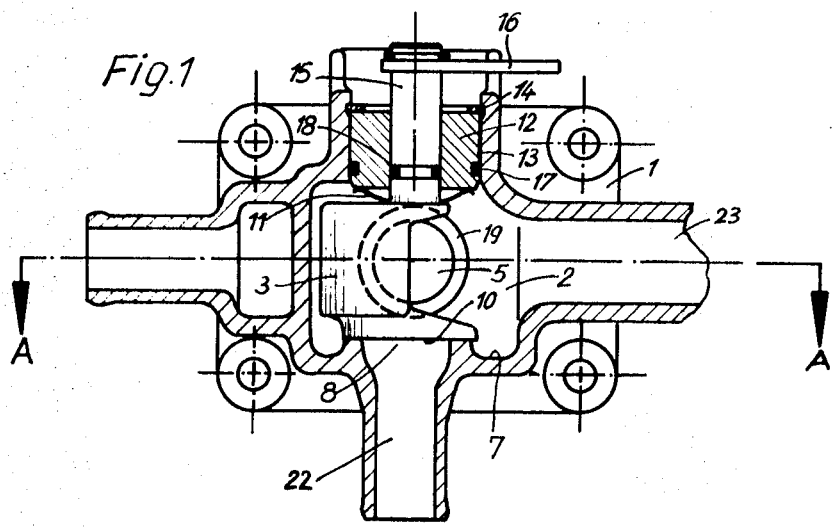
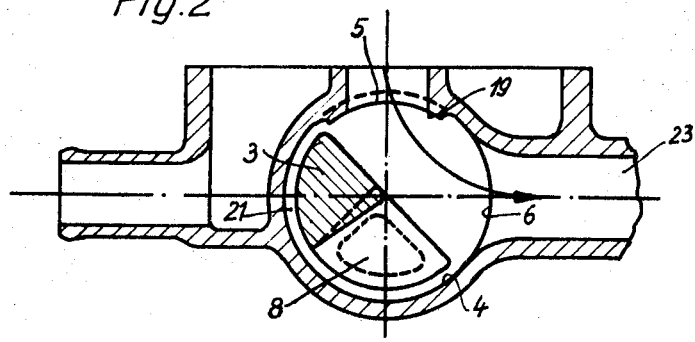
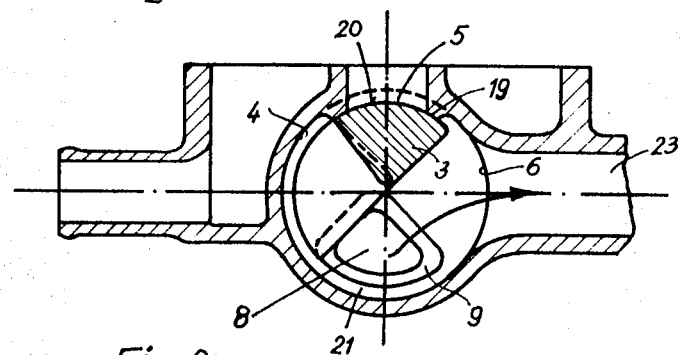

SELECTOR VALVE

This invention relates to a selector valve especially for warm water heating systems in motor vehicles. The valve comprises a casing with inlet and outlet ports which are controlled by a rotary valve member arranged within the housing.

In known selector valves the rotary valve member is cylindrical, conical or tubular and is sealingly arranged within a corresponding bore of the casing whereby the communication between the inlet and outlet ports is obtained by suitable passages or recesses in the valve member. These known valves have the disadvantage that, owing to contaminations, deposits and corrosion, considerable force only can accomplish a turning of the rotary valve member.

It is an object of the invention to provide a selector valve which is not sensitive to dirt, deposits and corrosion. This is especially important in warm water heating systems of motor vehicles as in this case the warm water always contains foreign particles from the cooling liquid cavities of the engine.

According to the invention the internal cavity of the casing which houses the rotary valve member has in its end wall and, preferably also in its peripheral wall, inlet and outlet ports which are controlled by the end face and by the peripheral surface, respectively, of the valve member. The rim of the port in the end wall is formed as a valve seating against which the valve member is resiliently urged and the valve member is supported within the casing solely outside the internal cavity.

Supporting the valve member outside the internal cavity, at a spot which does not come in contact with the heating fluid, thereby ensures that the movement of the valve member cannot be affected by foreign particles or by corrosion. Nevertheless, the arrangement of one or several ports in the end wall of the internal cavity of the casing and the resilient abutment of the valve member on this end wall ensures a reliable sealing of this port when it is closed by the valve member.

Preferably the end wall of the internal cavity is recessed outside of the valve seating so that foreign particles which may get between the valve seating and the valve member are pushed into the deeper regions of the end wall during movement of the valve member so that a sticking of the valve member is prevented.

If ports are also provided in the peripheral wall of the internal cavity it is proposed to form the rim of at least one of these ports as a raised valve seating so that a gap is always provided over the remaining portion of the peripheral wall between that wall and the peripheral surface of the valve member. Therewith, the heating fluid can flow around the valve member except in the region of the valve seating so that the valve member is prevented from being locked by foreign particles.

Preferably the valve member comprises a shaft which extends towards the outside through a bore in the casing and which is supported for rotation and axial displacement in a bearing member inserted into the bore. The bearing member is fixed against outward axial displacement within the bore and serves as an abutment for the spring which urges the valve member against the end wall of the internal cavity. Gaskets may be provided between the peripheral surface of the bearing member and the wall of the bore as well as between the shaft of the valve member and the bearing member.

One embodiment of the invention will now be described with reference to the accompanying drawings.

FIG. 1 is a sectional view of a selector valve according to the invention;

FIG. 2 is a sectional view along line A–A in FIG. 1;

FIG. 3 is a sectional view similar to FIG. 2 in which the valve member is in a different position;

Figure 4:
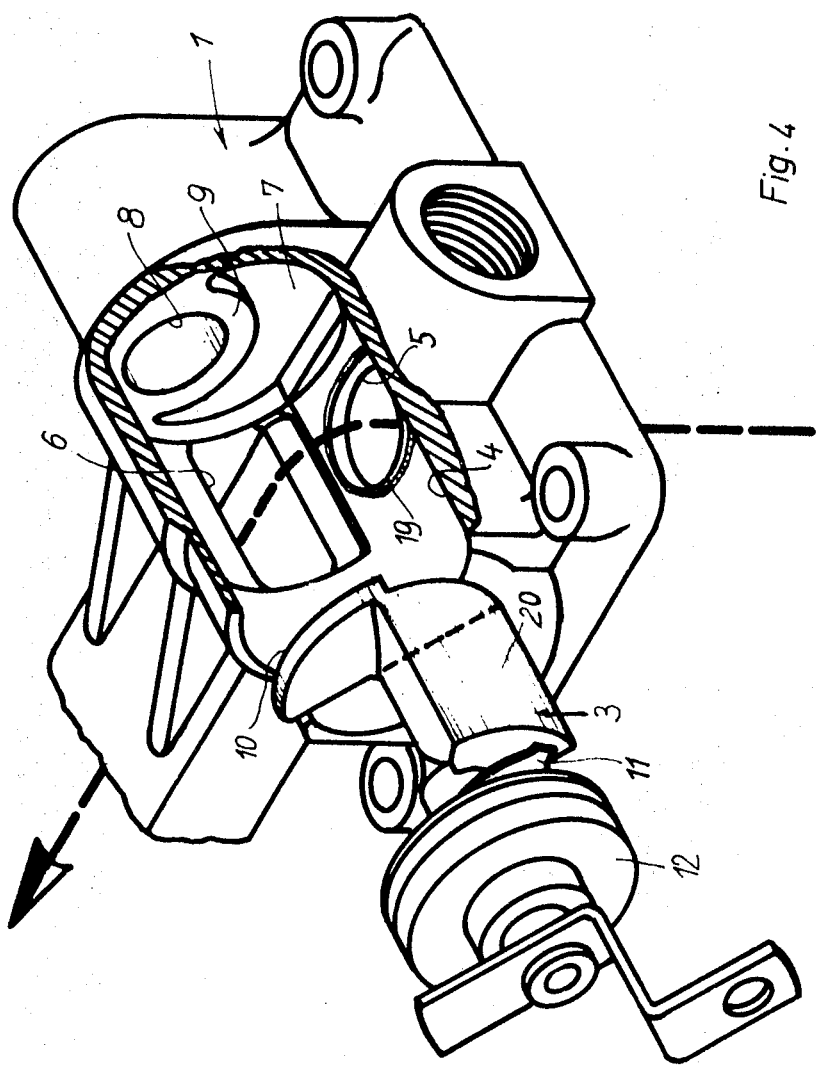
FIG. 4 is a part-sectional perspective view of the selector valve with the valve member shown outside the casing and in a position corresponding to FIG. 1.
Figure 5:
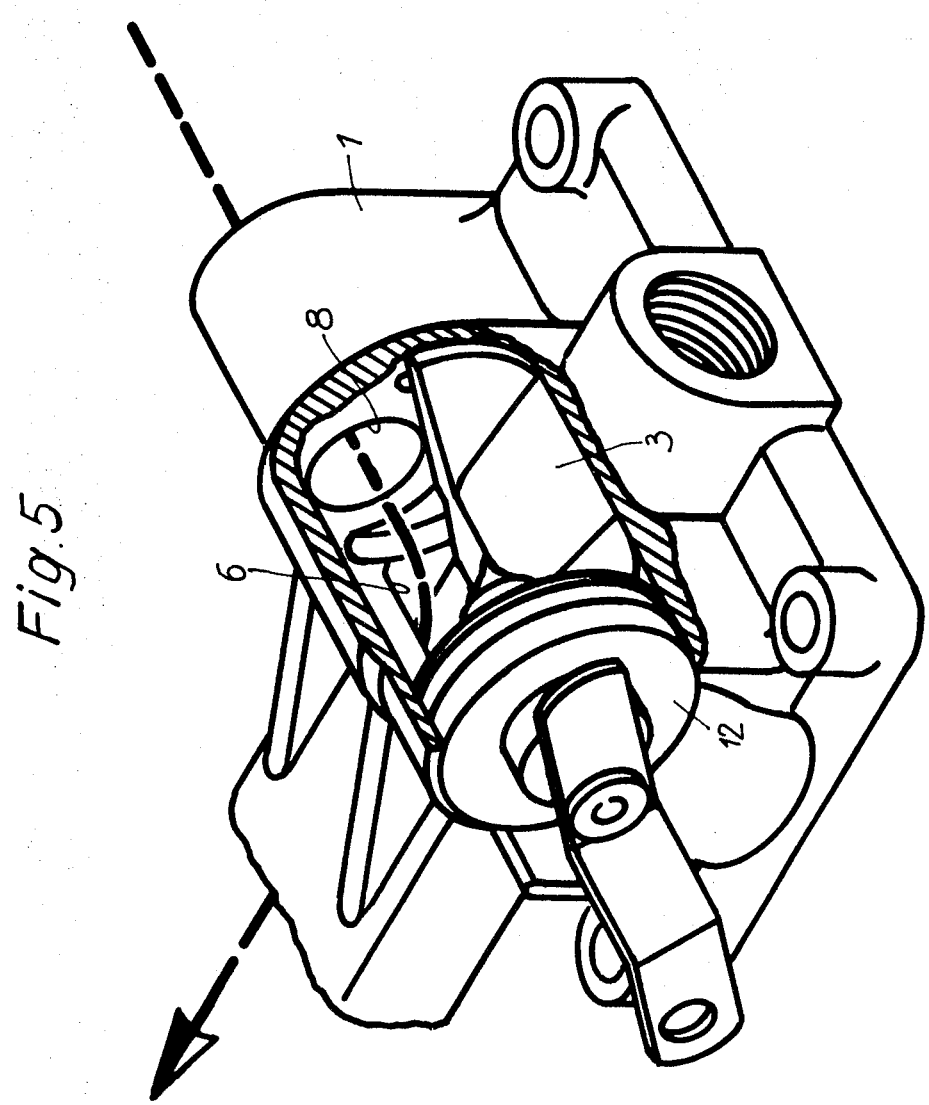
FIG. 5 is a part-sectional perspective view similar to FIG. 4 with the valve member in a position corresponding to FIG. 3.

The selector valve includes a casing 1 with a substantially cylindrical internal cavity 2 which houses a rotary valve member 3. Two ports 5 and 6 are provided in the peripheral wall 4 and a further port 8 is provided in the end wall 7 of the internal cavity 2. Port 8 is surrounded by a valve seating 9 which is raised with respect to the remaining portion of the end wall 7 and against which the valve member 3 with its end face 10 is urged by a spring 11. Spring 11 abuts on a bearing member 12 which is inserted in a bore 13 of casing 1 and which is fixed against axial outside displacement by a circlip 14. The shaft 15 of valve member 3 is supported in bearing member 12 for rotation and axial displacement and it carries at its outer end an operating lever 16. Gaskets 17 and 18 are provided between the bearing member 12 and the wall of bore 13 and between shaft 15 and bearing member 12, respectively. The rim 19 of port 5 arranged in peripheral wall 4 is raised to form a valve seating which, in the position of FIG. 3, cooperates with the peripheral surface 20 of valve member 3. Over the other portion of peripheral wall 4 there is always a gap 21 between the peripheral wall 4 and the peripheral surface 20 of valve member 3 so that the fluid can pass around the valve member 3 in the position shown in FIG. 2.

The selector valve is designed for the warm water heating system of a motor vehicle whereby port 8 communicates with a connection 22 which extends from the heat exchanger of the heating system. The heat exchanger is arranged in parallel to the cooling liquid circuit of the engine. Port 6 communicates with a connection 23 which leads to the water cooler, and port 5 is connected to the return pipe of the cooling liquid circuit of the engine. In the position of valve member 3 shown in FIG. 1, 2 and 4, the port 8 is closed. Therefore, the hot water cannot flow through the heat exchanger of the heating system but flows from the cavities of the engine through the ports 5 and 6 into connection 23 which leads to the cooler. If the valve member 3 is turned 90° to the position of FIG. 3, the peripheral surface 20 of valve member 3 closes the port 5 and simultaneously the end face 10 of valve member 3 opens port 8 so that hot water can flow through the heat exchanger and through ports 8 and 6 into connection 23 leading to the cooler.

The valve member 3 has substantially the shape of a sector of a circular cylinder whereby its end face 10 is partly relieved, as shown in FIG. 4, so that on turning of the valve member 3 foreign particles which may get between the end face 10 and the valve seating 9 are pushed into the deeper portion of end wall 7 outside the valve seating 9.

I claim:

1. Selector valve especially for hot water heating systems in motor vehicles comprising a housing with an internal cavity defined by a circumferential wall and end walls, a rotary valve element in the cavity for controlling inlet and outlet ports at least one of which being arranged in one end wall of the housing, the rim of the port in said one end wall serving as a valve seating, said valve element having a shaft which extends towards the outside through a bore in the other end wall defining the cavity, a bearing member inserted in the bore supporting the shaft for rotation and axial displacement, the bearing member being fixed against axial displacement towards the outside and serving as an abutment for a spring which urges the valve element against the valve seating of said end one wall, the valve element being supported solely by the bearing member and the valve seating.

2. A selector valve according to claim 1 in which the end wall of the internal cavity is recessed outside the valve seating.

3. A selector valve according to claim 1 in which the valve member is in the form of a sector of a circular cylinder.

4. A selector valve according to claim 1 wherein gaskets are arranged between the peripheral surface of the bearing member and the surface of the bore as well as between the shaft of the valve element and the bearing member.